United States Patent
Lin et al.

(10) Patent No.: US 9,635,274 B2
(45) Date of Patent: Apr. 25, 2017

(54) HIGH RESOLUTION MULTISPECTRAL IMAGE CAPTURE

(75) Inventors: Stephen S. Lin, Beijing (CN); Xin Tong, Beijing (CN); Xun Cao, Austin, TX (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/202,048

(22) PCT Filed: Jun. 15, 2011

(86) PCT No.: PCT/CN2011/075756
§ 371 (c)(1),
(2), (4) Date: Aug. 17, 2011

(87) PCT Pub. No.: WO2012/171185
PCT Pub. Date: Dec. 20, 2012

(65) Prior Publication Data
US 2014/0085502 A1 Mar. 27, 2014

(51) Int. Cl.
*H04N 9/73* (2006.01)
*H04N 5/235* (2006.01)
(Continued)

(52) U.S. Cl.
CPC ......... *H04N 5/2352* (2013.01); *H04N 5/2258* (2013.01); *H04N 5/23232* (2013.01); *H04N 9/09* (2013.01)

(58) Field of Classification Search
USPC ....................................................... 348/294
See application file for complete search history.

(56) References Cited

U.S. PATENT DOCUMENTS 6,711,306 B1 * 3/2004 Denber ........................ 382/308
7,149,366 B1 12/2006 Sun
(Continued)

FOREIGN PATENT DOCUMENTS

CN 1484039 A 3/2004
CN 1484040 A 3/2004
(Continued)

OTHER PUBLICATIONS

Greiwe, et al., "Combined Analysis of Hyperspectral and High Resolution Image Data in an Object Oriented Classification Approach" Proceedings of the Joint Symposia URBAN-URS 2005 in International Archives of Photogammetry, Remote Sensing and Spatial Information Sciences, vol. XXXVI, Part 8/W27, Mar. 2005, 6 pages.
(Continued)

*Primary Examiner* — Stephen Coleman
(74) *Attorney, Agent, or Firm* — Cassandra Swain; Micky Minhas

(57) ABSTRACT

The use of a hybrid camera tool may capture high resolution multispectral images without sacrificing resolution in exchange for spectral accuracy. The capture of a high resolution multispectral image may include forming a high spatial resolution image based on a portion of incoming light and generating a high spectral resolution image that includes multispectral samples based on another portion of the incoming light. The high resolution multispectral image is then synthesized by consolidating the high spatial resolution image with the high spectral resolution image.

18 Claims, 5 Drawing Sheets

(51) Int. Cl.
  H04N 5/225    (2006.01)
  H04N 5/232    (2006.01)
  H04N 9/09     (2006.01)

(56) References Cited

U.S. PATENT DOCUMENTS

| | | | |
|---|---|---|---|
| 7,385,705 B1 | 6/2008 | Hoctor | |
| 7,826,685 B2 | 11/2010 | Riley | |
| 8,699,790 B2 | 4/2014 | Liu | |
| 2005/0111754 A1 | 5/2005 | Cakir et al. | |
| 2006/0017924 A1* | 1/2006 | Kowarz et al. | 356/330 |
| 2008/0131025 A1 | 6/2008 | Riley | |
| 2008/0245976 A1* | 10/2008 | Eastlund et al. | 250/494.1 |
| 2008/0259354 A1 | 10/2008 | Gharib et al. | |
| 2009/0290811 A1 | 11/2009 | Imai | |
| 2010/0277700 A1* | 11/2010 | Inoue et al. | 353/37 |
| 2010/0302376 A1 | 12/2010 | Boulanger et al. | |
| 2011/0002505 A1* | 1/2011 | Barrow | 382/103 |
| 2012/0300064 A1 | 11/2012 | Mann | |

FOREIGN PATENT DOCUMENTS

| | | |
|---|---|---|
| CN | 101233763 A | 7/2008 |
| CN | 102542549 A | 7/2012 |
| EP | 1956410 A2 | 8/2008 |
| EP | 2395392 A1 | 12/2011 |
| GB | 2474557 A | 4/2011 |
| JP | 57179807 | 11/1982 |
| JP | 11313334 | 11/1999 |
| JP | 2006186573 | 12/2004 |
| JP | 2005210164 | 8/2005 |
| JP | 2005341175 | 12/2005 |
| JP | 2009146401 | 7/2009 |
| JP | 2009147727 | 7/2009 |
| JP | 2010056927 | 3/2010 |
| KR | 101291219 B1 | 7/2013 |
| WO | WO2010/005595 A1 | 1/2010 |

OTHER PUBLICATIONS

Imai, et al., "High-Resolution Multi-Spectral Image Archives: A Hybrid Approach", Proceedings of the IS&T/SID Sixth Color Imaging Conference Color Science, Systems, and Applications, Nov. 1998, pp. 224-227.
Mahmoundi, "Contourlet-Based Image Fusion using Information Measures", Proceedings of the 2nd WSEAS Internationsl Symposium on Wavelets Theory & Applications in Applied Mathematics, Signal Processing & Modern Science (WAV'08), May 2008, pp. 157-162.
Ranchin, et al., "Fusion of High Spatial and Spectral Resolution Images: The ARSIS Concept and Its Implementation", Photogrammetric Engineering & Remote Sensing, vol. 66, No. 1, Jan. 2000, pp. 49-61.
Schultz, et al., "Extraction of High-Resolution Frames from Video Sequences", IEEE Transactions on Image Processing, vol. 5, No. 6, Jun. 1996, pp. 996-1011.
Cao et al., "High Resolution Multispectral Video Capture with a Hybrid Camera System", available at least as early as May 4, 2011 at <<http://media.au.tsinghua.edu.cn/hybrid-camera-multispectral.wmv>>.
Cao, et al., "High Resolution Multispectral Video Capture with a Hybrid Camera System", 2011 IEEE Conference on Computer Vision and Pattern Recognition (CVPR), Jun. 2011, 8 pages.
The Supplementary European Search Report mailed Apr. 11, 2014 for European Patent Application No. 11867775.6, 6 pages.
The European Office Action mailed Apr. 23, 2014 for European patent application No. 11867775.6, a counterpart foreign application of U.S. Appl. No. 13/202,048, 6 pages.
The Supplementary European Search Report mailed Mar. 11, 2014 for European Patent Application No. 11867775.6, 6 pages.

The European Office Action mailed Nov. 13, 2014 for European patent application No. 11867775.6, a counterpart foreign application of U.S. Appl. No. 13/202,048, 4 pages.
The European Office Action mailed Sep. 4, 2014 for European patent application No. 11867775.6, a counterpart foreign application of U.S. Appl. No. 13/202,048, 4 pages.
English Translation of First Office Action and Search Report issued in Chinese Patent Application No. 201180071639.3, Mailed Date: Apr. 3, 2015, 14 Pages.
Translated Japanese Office Action mailed Jun. 2, 2015 for Japanese patent application No. 2014-515023, a counterpart foreign application of U.S. Appl. No. 13/202,048, 13 pages.
Adobe after Effects CC, retrieved on May 7, 2015, 3 pages.
Aharon et al., "K-SVD: An Algorithm for Designing Overcomplete Dictionaries for Sparse Representation," In Journal of IEEE Transactions on Signal Processing, vol. 54, No. 11, Nov. 2006, 12 pages.
Al-Helali et al., "Slantlet Transform for Multispectral Image Fusion," Apr. 2009, In Journal of Computer Science, vol. 5, Issue 4, 3 pages.
Arce et al., "Compressive Coded Aperture Spectral Imaging: An Introduction," In Journal of IEEE Signal Processing Magazine, vol. 31, Issue 1, Jan. 2014, 11 pages.
Basedow et al., "Hydice System: Implementation and Performance," In Proceedings of SPIE vol. 2480, Imaging Spectrometry, Jun. 12, 1995, 2 pages.
Ben-Ezra et al., "Motion Deblurring Using Hybrid Imaging," In Proceedings of IEEE Computer Society Conference on Computer Vision and Pattern Recognition, Jun. 16, 2003, 8 pages.
Bioucas-Dias et al., "A New TwIST: Two-Step Iterative Shrinkage/Thresholding Algorithms for Image Restoration," In Journal of IEEE Transactions on Image Processing, vol. 16, Issue 12, Dec. 2007, 13 pages.
Blackburn et al., "Feature Aided Tracking with Hyperspectral Imagery," Sep. 25, 2007, In Proceedings of SPIE 6699, Signal and Data Processing of Small Targets, 12 pages.
Borengasser et al.,"Hyperspectral Romote Sensing: Principles and Applications," In Publication CRC Press, Dec. 13, 2007, 4 pages.
Brady, "Optical Imaging and Spectroscopy," In Proceedings of Wiley-OSA, Apr. 13, 2009, 13 pages.
Candes et al., Compressed Sensing with Coherent and Redundant Dictionaries, In Proceedings of Applied and Computational Harmonic Analysis, vol. 31, Issue 1, Jul. 2011, 21 pages.
Candes, "Compressive Sampling," In Proceedings of the International Congress of Mathematicians, Aug. 22, 2006, 20 pages.
Chakrabarti et al., "Statistics of Real-World Hyperspectral Images," In Proceedings of the IEEE Computer Society Conference on Computer Vision and Pattern Recognition, Jun. 21, 2011, 8 pages.
Chen et al., "SIRF: Simultaneous Image Registration and Fusion in a Unified Framework," In Journal of Latex Class Files, Nov. 2014, 13 pages.
Delaur'e et al., "The Geospectral Camera: A Compact and Geometrically Precise Hyperspectral and High Spatial Resolution Imager," May 21, 2013, In Proceedings of International Archives of the Photogrammetry, Remote Sensing and Spatial Information Sciences, vol. XL-1/W1, 6 pages.
Descour et al., "Computed-Tomography Imaging Spectrometer: Experimental Calibration and Reconstruction Results." In Proceedings of Applied Optics vol. 34, Issue 22, Aug. 1, 1995, 10 pages.
Dhore et al., "A New Pan-Sharpening Method Using Joint Sparse FI Image Fusion Algorithm," Jun. 2014, In International Journal of Engineering Research and General Science, vol. 2, Issue 4, 9 pages.
Dong et al., "Nonlocally Centralized Sparse Representation for Image Restoration," In IEEE Transactions on Image Processing, vol. 22, Issue 4, Apr. 2013, 11 pages.
Donoho, "Compressed Sensing," In IEEE Transaction Information Theory, vol. 52, No. 12, Sep. 14, 2004, 34 pages.
Du et al., "A Prism-Based System for Multispectral Video Acquisition," In Proceedings of IEEE 12th International Conference on Computer Vision, Sep. 29, 2009, 8 pages.
Gat, "Imaging Spectroscopy using Tunable Filters: A Review," In Proceedings of SPIE 4056, Wavelet Applications VII, Apr. 5, 2000, 15 pages.

(56) References Cited

OTHER PUBLICATIONS

Gat et al., "Spectral Imaging Applications: Remote Sensing, Environmental Monitoring, Medicine, Military Operations, Factory Automation, and Manufacturing," In Proceedings of SPIE 2962, 25th AIPR Workshop: Emerging Applications of Computer Vision, Feb. 26, 1997, 2 pages.
Gehm et al., "Single-Shot Compressive Spectral Imaging with a Dual-disperser Architecture," In Proceedings of Optics Express vol. 15, Issue 21, Oct. 17, 2007, 15 pages.
James, "Spectrograph Design Fundamentals," In Cambridge University Press, Feb. 12, 2007, 3 pages.
Kim et al., "3D Imaging Spectroscopy for Measuring Hyperspectral Patterns on Solid Objects," In Proceedings of ACM SIGGRAPH, vol. 31, Issue 4, Jul. 2012, 11 pages.
Kruse et al., "The Spectral Image Processing System (SIPS)—Interactive Visualization and Analysis of Imaging Spectrometer Data," In Proceedings of Remote Sensing of Environment, vol. 44, Issue 2-3, May 1993, 19 pages.
Li et al., "A New Pan-Sharpening Method Using a Compressed Sensing Technique", In the Proceedings of the IEEE Transactions on Geoscience and Remote Sensing, vol. 49, No. 2, Feb. 2011, pp. 738-746.
Li et al., "Remote Sensing Image Fusion via Sparse Representations Over Learned Dictionaries," In Proceedings of IEEE Transactions on Geoscience and Remote Sensing, vol. 51, No. 9, Sep. 2013, 11 pages.
Lin et al., "Dual-Coded Compressive Hyperspectral Imaging," In Journal of Optics Letters, vol. 39, Issue 7, Apr. 2014, 5 pages.
Lin et al., "Spatial-spectral Encoded Compressive Hyperspectral Imaging," Nov. 2014, In Journal of ACM Transactions on Graphics, vol. 33, Issue 6, 11 pages.
Liu et al., "Efficient Space-Time Sampling with Pixel-Wise Coded Exposure for High-Speed Imaging," In IEEE Transactions on Pattern Analysis and Machine Intelligence, vol. 36, Issue 2, Feb. 2014, 13 pages.
Ma et al., "Acquisition of High Spatial and Spectral Resolution Video with a Hybrid Camera System," Nov. 1, 2014, In International Journal of Computer Vision, vol. 110, Issue 2, 5 pages.
Ma et al., "Content-Adaptive High-Resolution Hyperspectral Video Acquisition with a Hybrid Camera System," In Journal Optics Letters, vol. 39, Issue 4, Feb. 2014, 5 pages.
Manakov et al., "A Reconfigurable Camera Add-on for High Dynamic Range, Multispectral, Polarization, and Light-Field Imaging," In Journal ACM Transactions on Graphics, vol. 32 Issue 4, Jul. 2013, 14 pages.
Mian et al., "Hyperspectral Video Restoration using Optical Flow and Sparse Coding," In Journal Optics Letters, vol. 20, Issue 10, May 7, 2012, 16 pages.
Okamoto et al., "Simultaneous Acquisition of Spectral Image Information," In Journal Optics Letters, vol. 16, Issue 16, Aug. 1991, 3 pages.
Porter et al., "A System Overview of the Airborne Visible/Infrared Imaging Spectrometer (Aviris)," In Proceedings of SPIE, vol. 0834, Jan. 1, 1987, 2 pages.
Schechner et al., "Generalized Mosaicing: Wide Field of View Multispectral Imaging," In Proceedings of IEEE Transactions on Pattern Analysis and Machine Intelligence, vol. 24, No. 10, Oct. 2002, 15 pages.
Tai et al., "Image/Video Deblurring using a Hybrid Camera," In Proceedings of IEEE Conference on Computer Vision and Pattern Recognition, Jun. 23, 2008, 8 pages.
Tropp et al., "Signal Recovery from Random Measurements via Orthogonal Matching Pursuit," In Proceedings of IEEE Transactions on Information Theory, vol. 53, Issue 12, Dec. 2007, 12 pages.
Van Nguyen et al., "Tracking via Object Reflectance using a Hyperspectral Video Camera," In IEEE Computer Society Conference on Computer Vision and Pattern Recognition Workshops, Jun. 3, 2010, 8 pages.
Wagadarikar et al., "Single Disperser Design for coded Aperture Snapshot Spectral Imaging," In Proceedings of Applied Optics, vol. 47, Issue 10, Apr. 1, 2008, 8 pages.
Wagadarikar et al., "Video rate spectral imaging using a Coded Aperture Snapshot Spectral Imager," Apr. 13, 2008, In Proceedings of Applied Optics, vol. 47, Issue 10, 21 pages.
Wang et al. "Dual-Camera Design for Coded Aperture Snapshot Spectral Imaging," In Proceedings of Applied Optics, vol. 54, Issue 4, Feb. 1, 2015, 11 pages.
Wang et al., "Image Quality Assessment: From Error Visibility to Structural Similarity," In Proceedings of IEEE Transactions on Image Processing, vol. 13, No. 4, Apr. 2004, 14 pages.
Yasuma et al., "Generalized Assorted Pixel Camera: Postcapture Control of Resolution, Dynamic Range, and Spectrum," In Proceedings of IEEE Transactions on Image Processing, vol. 19, No. 9, Sep. 2010, 13 pages.
Yin et al., "Wavelet-domain Hidden Markov Tree Model Approach to Fusion of Multispectral and Panchromatic Images," Published Sep. 24, 2011, In Information Technology Journal, vol. 10, Issue 11, 6 pages.
The Chinese Office Action mailed Dec. 14, 2015 for Chinese patent application No. 201180071639.3, a counterpart foreign application of U.S. Appl. No. 13/202,048, 6 pages.

* cited by examiner

HIGH RESOLUTION MULTISPECTRAL IMAGE CAPTURE

CROSS REFERENCE TO RELATED APPLICATIONS

This application is a 35 U.S.C. 371 National Stage Application of International Application No. PCT/CN2011/075756, filed Jun. 15, 2011, the entire contents of which are incorporated herein by reference.

BACKGROUND

Light from the surrounding environment is sensed in color within the human eye. The human eye perceives colors using three types of cone cells sensitive to different parts of the light spectrum, namely cone cells that are sensitive to red, green, and blue (RGB) wavelength light. Conventional video cameras may record RGB data that adequately replicate colors for human viewing. However, the spectrum of visible light reflecting off of an object being captured may contain a profusion of details that are lost to the coarse three-channel sensing of RGB data. These lost spectral details may otherwise reveal a multitude of additional information about objects that are recorded in images, as well as the lighting conditions under which the objects are recorded.

SUMMARY

Described herein are techniques for implementing a hybrid camera tool that combines red, green, blue (RGB) image information acquired from a RGB camera and multispectral image data acquired from a grayscale camera to produce images with both high spectral and high spatial resolution. The hybrid camera tool may offer superior images than a standalone RGB camera that captures high spatial resolution but low spectral resolution. The hybrid camera tool may also offer superior images than a standalone grayscale camera that captures high spectral resolution but low spatial resolution. Thus, unlike systems that tradeoff either temporal or spatial resolution for additional spectral information, the hybrid camera tool does not sacrifice resolution in exchange for spectral accuracy.

In at least one embodiment, the capture of a high resolution multispectral image may include forming a high spatial resolution image based on a portion of incoming light. A high spectral resolution image that includes multispectral samples may also be generated based on another portion of the incoming light. A high spatial and high spectral resolution image is then synthesized by consolidating the high spatial resolution image with the high spectral resolution image.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

The embodiments described herein pertain to techniques for implementing a hybrid camera tool that captures high resolution multispectral images. The hybrid camera tool may combine RGB image information and multispectral image data to produce images with both high spectral and high spatial resolution. The RGB image information may be acquired using a RGB camera, and the multispectral image data may be acquired using a grayscale camera. The hybrid camera tool may offer superior images than a standalone RGB camera by providing images with higher spectral resolution. The hybrid camera tool may also offer superior images than a standalone grayscale camera by providing images with higher spatial resolution. Thus, unlike systems that tradeoff either temporal or spatial resolution for additional spectral information, the hybrid camera tool does not sacrifice resolution in exchange for spectral accuracy. Various examples of techniques for using the hybrid camera tool to provide high spatial resolution and high spectral resolution images in accordance with the embodiments are described below with reference to FIGS. 1-5.

Example Scheme

Figure 1:
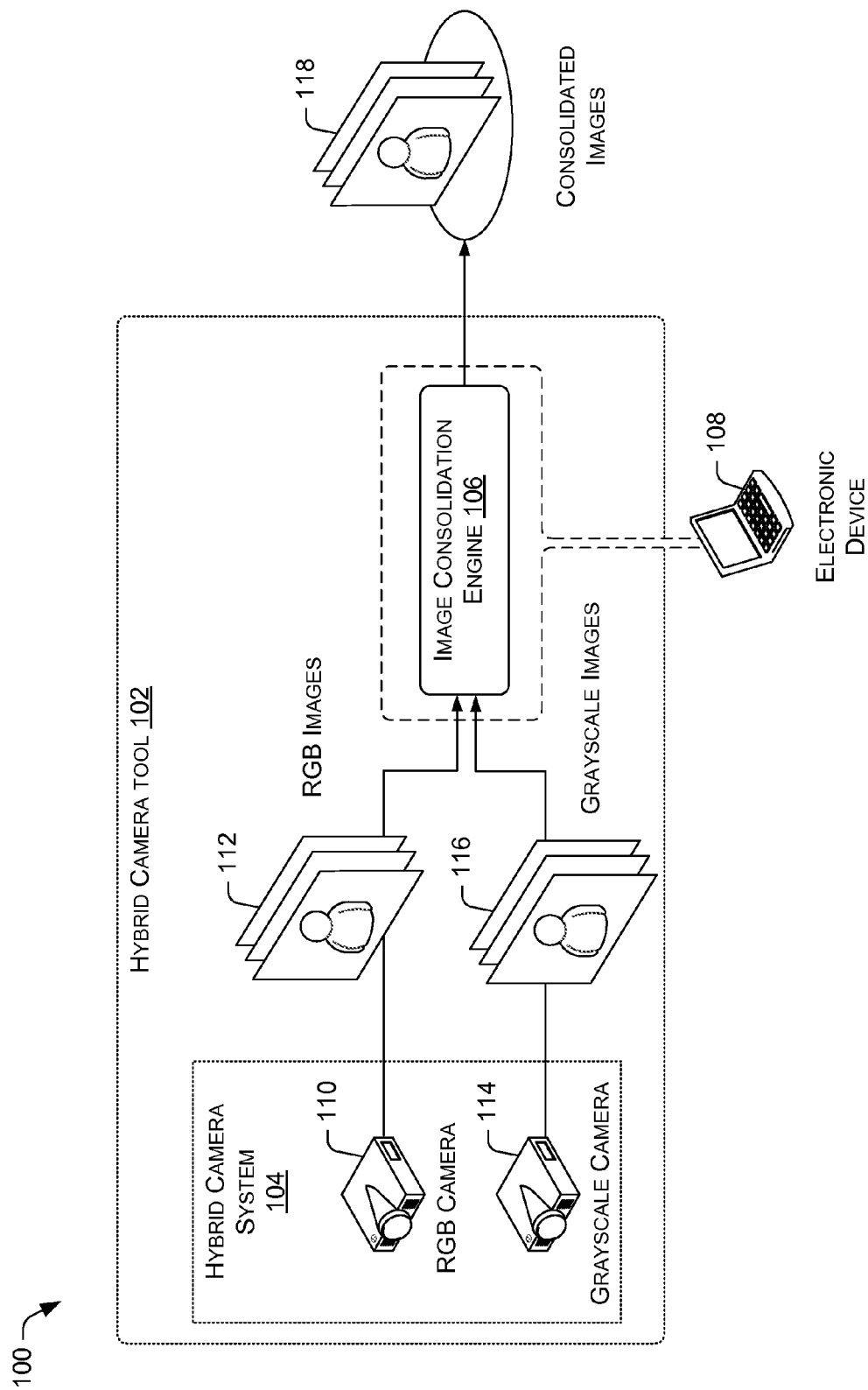
FIG. 1 is a block diagram that illustrates an example scheme that implements a hybrid camera tool.

FIG. 1 is a block diagram that illustrates an example scheme 100 that implements a hybrid camera tool 102. The hybrid camera tool 102 may include a hybrid camera system 104 and an image consolidation engine 106 that is implemented by an electronic device 108. The hybrid camera system 104 may include a red, green, blue (RGB) camera 110 that captures one or more RGB images 112 and a grayscale camera 114 that captures one or more grayscale images 116. Each of the RGB images 112 may have high spatial resolution and low spectral resolution. For example, each of the RGB images 112 may have lower spectral resolution than a corresponding grayscale image 116. In contrast, each of the grayscale images 116 may have low spatial resolution and high spectral resolution. For example, each of the grayscale images 116 may have a lower spatial resolution than a corresponding RGB image 112.

The RGB camera 110 may be a camera that uses a charge-coupled device (CCD)-based sensor to acquire three independent red, green, blue colored channels of data that represent the light reflected from a scene or object. The grayscale camera 114 may be a camera that acquires images using a single multispectral CCD sensor that captures the intensity of light reflected from a scene or object as various shades of gray that range from pure white to pure black. Each of the RGB camera 110 and the grayscale camera 114 may be capable of capturing individual images or a continuous stream of images that form a video. In some embodiments, the RGB camera may be capable of capturing a resolution of 1024×768 pixels (or other resolutions) at 25 frames per second (fps) or higher. In other embodiments, the grayscale camera may be capable of capturing images at 25 fps or higher at a resolution of 2448×2088 pixels (or other resolutions).

The signals from the RGB camera 110 and the grayscale camera 114 of the hybrid camera system 104 may be passed to the image consolidation engine 106. In turn, the image consolidation engine 106 may use a propagation algorithm to combine multispectral samples from the grayscale images 116 with the RGB information in the RGB images 112 based on color similarity and spatial proximity. Accordingly, the image consolidation engine 106 may produce one or more consolidated images 118 that have both high spatial resolution and high spectral resolution. In various embodiments, the consolidated images 118 may be part of a video stream that is synthesized in real-time (e.g., at a rate of 25 fps or higher) from a sequence of RGB images 112 and a corresponding sequence of grayscale images 116.

Example Hybrid Camera System

Figure 2:
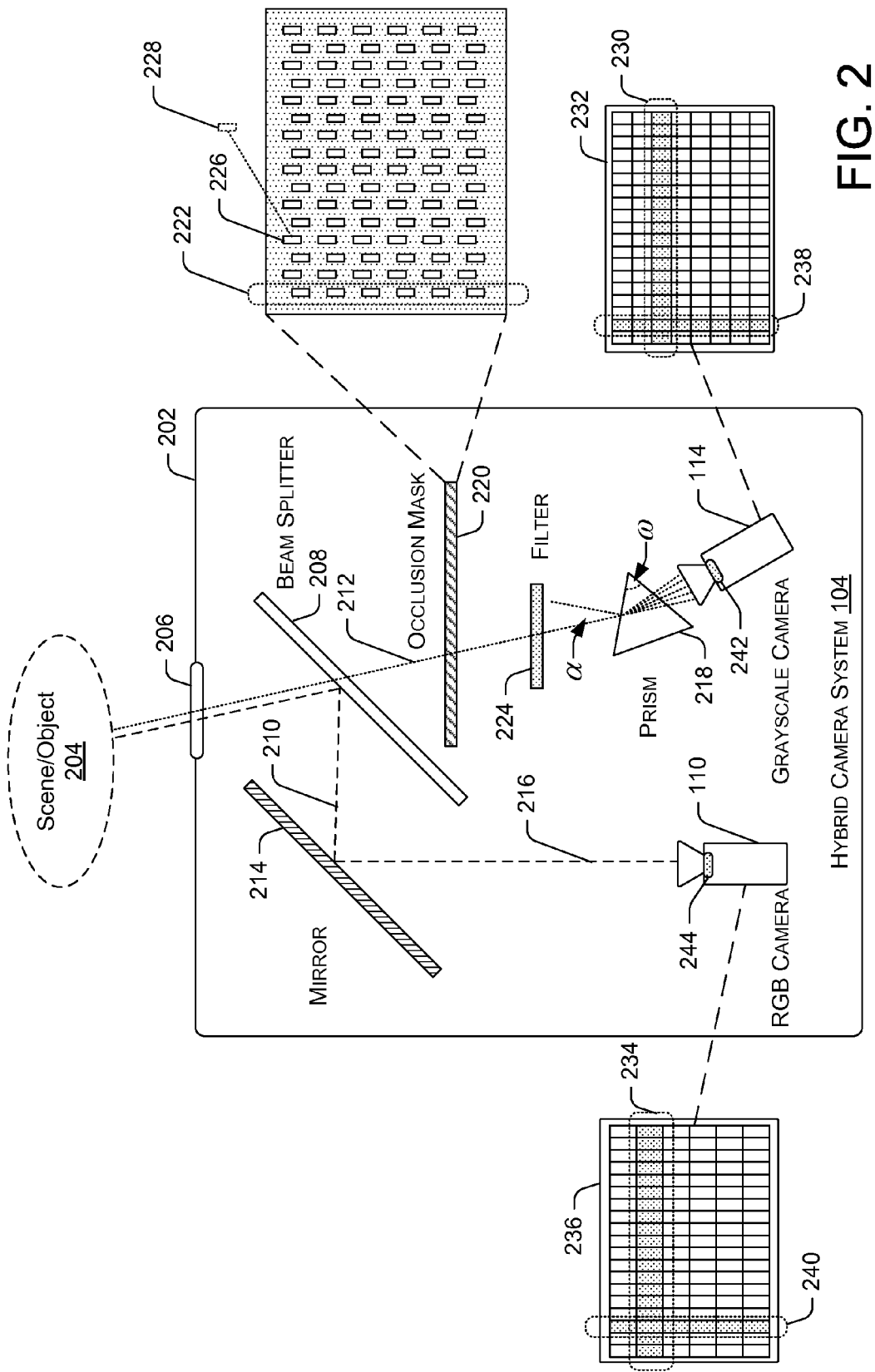
FIG. 2 is an illustrative diagram that shows the example components of the hybrid camera system.

FIG. 2 is an illustrative diagram showing example components of the hybrid camera system 104. The hybrid camera system 104 may include the RGB camera 110 and the grayscale camera 114. The hybrid camera system 104 may include an opaque enclosure 202 that isolates the components of the hybrid camera system 104 from background light. Incoming light from a scene or object 204 may initially enter the hybrid camera system 104 through an aperture 206 and reach a beam splitter 208. The beam splitter 208 may reflect a portion of the light along the path 210, while transmitting at least some of the remaining portion of the light along the path 212. In various embodiments, the beam splitter 208 may be a half-reflect and half-pass beam splitter that provides the RGB camera 110 and the grayscale camera 114 with equal or nearly equal light energy.

The reflected light from the beam splitter 208 that is traveling along the path 210 may be further reflected by a mirror 214 along the path 216 to arrive at the RGB camera 110. The RGB camera 110 may then acquire high spatial resolution image data in the form of RGB images 112 from the light along the path 216. In alternative embodiments, the RGB camera 110 may be placed in the position of the mirror 214 so that light along the path 210 directly enters the RGB camera 110. However, the use of the mirror 214 to redirect the light along the path 216 may make the hybrid camera system 104 more compact as the RGB camera 110 and the grayscale camera 114 may be positioned closer together, i.e., distance between the two cameras reduced.

The light transmitted through the beam splitter 208 along the path 212 may be dispersed by a prism 218 (or some other spectrally dispersive optical component) onto the grayscale camera 114. The grayscale camera 114 may acquire high spectral resolution grayscale images 116 that capture numerous spectral channels of the light from the scene or object 204. An occlusion mask 220 may be employed along the path 212 to subsample the light radiance from the scene or object 204, so that overlap of spectra from different scene points of the scene or object 204 may be prevented from being transmitted to the grayscale camera 114. However, because of this sub-sampling, the light reaching the grayscale camera 114 may result in image data that has low spatial resolution.

In various embodiments, the occlusion mask 220 may be configured with regularly spaced rows of openings, such as row 222, that are designed to convey light to the prism 218. Each opening may provide one multispectral sample to the grayscale camera 114. For example, an opening 226 in the occlusion mask 220 may result in a multispectral sample 228. In at least one embodiment, each of the openings may be rectangular in shape. The prism 218 may be made of glass with a known refraction indices for wavelengths 400 to 1000 nanometers (nms). The prism 218 may disperse light in along a particular direction, and multispectral samples in a perpendicular direction may optionally be averaged to minimize noise.

Thus, the arrangement of the occlusion mask 220 and the prism 218 may provide the multispectral samples to the grayscale camera 114. In one example instance, the arrangement may be configured in relation to the grayscale camera 114 so that each spectral sample spans approximately 60 pixels on a grayscale sensor of the grayscale camera 114 over the wavelength of 400 nm to 700 nm, which is equivalent to a spectral resolution of about 5 nm.

In further embodiments, a filter 224 may be placed along the path 212 between the beam splitter 208 and the prism 218 to filter out certain spectrum bands. The filter 224 may be implemented when it is desired that only a selected range of spectrum bands reach the grayscale camera 114.

The operations of the RGB camera 110 and the grayscale camera 114 may be consolidated so that each high spatial resolution RGB image 112 is captured simultaneously with a corresponding high spectral resolution grayscale image 116. Further, the RGB camera 110 and the grayscale camera 114 may be aligned to capture the same view of the scene or object 204. Further, the correspondence of the image information captured by the RGB camera 110 and the grayscale camera 114 may be achieved using a calibration video of sweeping horizontal and vertical lines.

In at least one embodiment, the calibration video may be presented using a display screen positioned in front of the RGB camera 110 and the grayscale camera 114 that are aligned to capture the same view. The sweeping lines may be presented on the display screen in white against a dark background. Further, each of the displayed sweeping lines may have a spectrum with spectrum peaks similar to those of fluorescent light. Thus, when a horizontal line sweeps onto a horizontal sensor section 230 (e.g., a horizontal row of sensors elements) of an example grayscale sensor 232 in the grayscale camera 114, the light from the sweeping horizontal line may produce a response from the horizontal sensor section 230. The same sweeping horizontal line also may, at the instance it triggers the response in the example grayscale sensor 232, also trigger a similar response in a horizontal sensor section 234 (e.g., a horizontal row of sensor elements) of an example RGB sensor 236 in the RGB camera 110. In this way, the corresponding horizontal sensor sections of the grayscale camera 114 and the RGB camera 110 may be identified.

In the same manner, when a vertical line sweeps onto a vertical sensor section 238 (e.g., a vertical row of sensor elements) of the example grayscale sensor 232, the light from the sweeping vertical line may produce a response from a vertical sensor section 238. The same sweeping vertical line also may, at the instance it triggers the response in the example grayscale sensor, also trigger a similar response in the vertical sensor section 240 (e.g., a vertical row of sensor elements) of the example RGB sensor 236 in the RGB camera 110. In this way, the corresponding vertical sensor sections of the grayscale camera 114 and the RGB camera 110 may also be identified. Based on the correspondence between the horizontal sensor sections (e.g., horizontal sensor sections 230 and 234) and the correspondence between the vertical sensor sections (e.g., vertical sensor sections 238 and 240), the correspondences of individual multispectral samples to pixels detected by the example RGB sensor 236 of the RGB camera 110 may be determined. Accordingly, once the RGB camera 110 and the grayscale camera 114 are calibrated, each multispectral sample point in the grayscale image 116 may have a counterpart pixel in a corresponding RGB image 112 that shares the same incoming light.

In various embodiments, the setting of the hybrid camera system 104 may be adjusted for different spectral resolutions. The spectral resolution may depend on several parameters, as shown below in equation (1):

$$SpectralResolution \propto \left\{ f, n, \omega, \frac{1}{\alpha} \right\} \quad (1)$$

in which the f is the focal length of a camera lens 242 of the grayscale camera 114, n is the refraction index of the prism 218, ω is the prism angle and α is the incident light angle. Spectral resolution may be increased using a larger focal length camera lens 242 for the grayscale camera 114 with a suitable occlusion mask 220 that prevents overlaps of spectra on the sensor. However, the increase in spectral resolution may result in fewer multispectral samples per image, which may reduce propagation accuracy. The use of a larger focal length may also result in less light energy reaching the sensor (e.g., grayscale sensor 232) of the grayscale camera 114. However, the diminished light energy may be compensated for by increasing exposure time for each image and/or a lower frame rate.

In some embodiments, the RGB camera 110 and the grayscale camera 114 may be positioned with respect to the opaque enclosure 202 so that incoming light from the aperture 206 reaches the camera lens 242 of the grayscale camera and a camera lens 244 of the RGB camera 110. However, the bodies of the cameras, which may include the sensors 232 and 236, respectively, and associated imaging processing and transmission components may be implemented outside of the opaque enclosure 202. Further, the imaging processing and transmission components of both components may be integrated into a single electronics package rather than as separate packages.

Electronic Device Components

Figure 3:
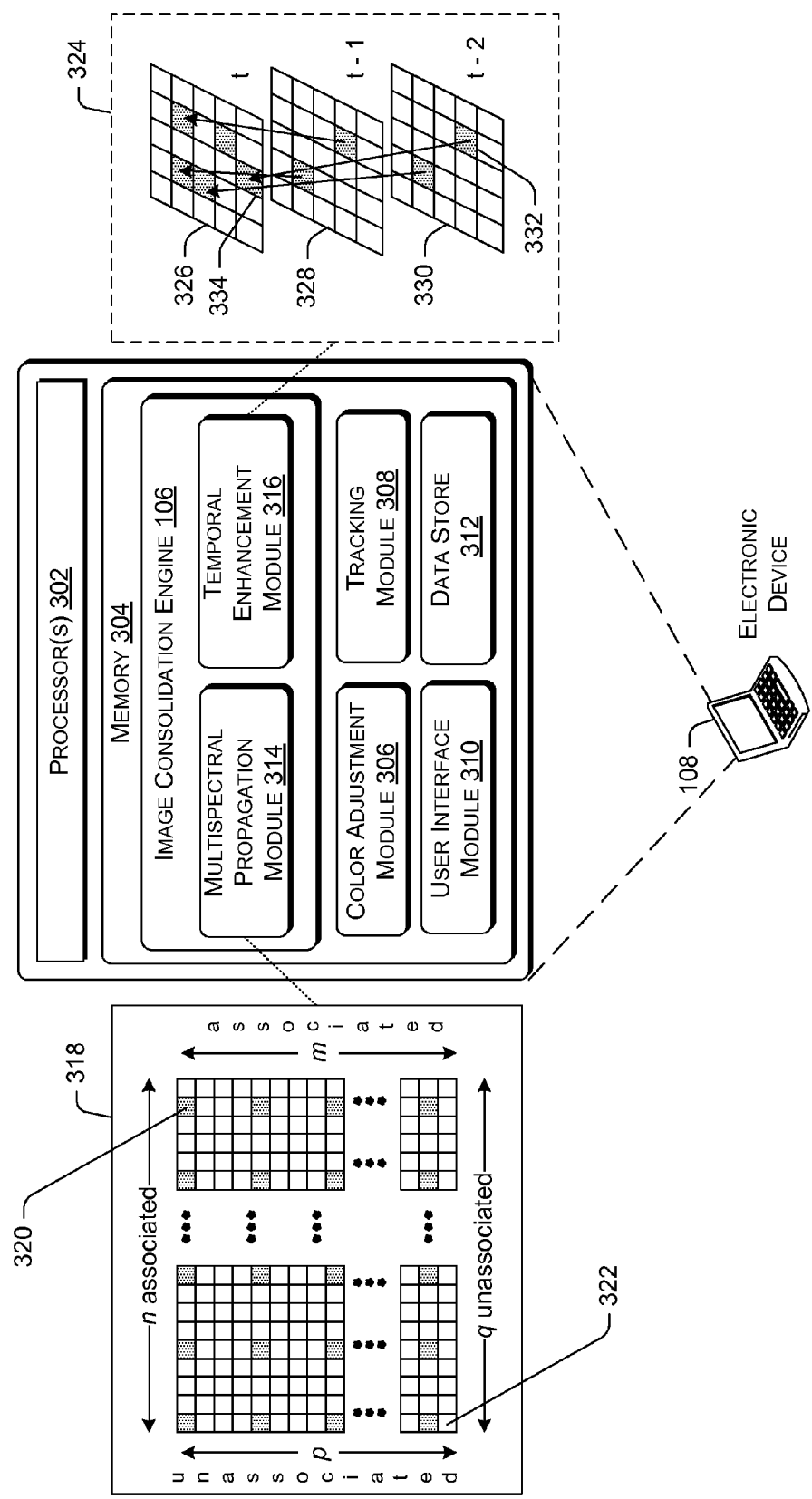
FIG. 3 is a block diagram that shows selected illustrative components of an electronic device that implements the hybrid camera tool.

FIG. 3 is a block diagram that shows selected illustrative components of an electronic device 108 that implements the hybrid camera tool. In various embodiments, the electronic device 108 may be a general purpose computer, such as a desktop computer, a tablet computer, a laptop computer, a server, and so forth. However, in other embodiments, the electronic device 108 may be one of a camera, a smart phone, a game console, a personal digital assistant (PDA), and so forth.

The electronic device 108 may includes one or more processors 302, memory 304, and/or user controls that enable a user to interact with the electronic device. The memory 304 may be implemented using computer readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

The electronic device 108 may have network capabilities. For example, the electronic device 108 may exchange data with other electronic devices (e.g., laptops computers, servers, etc.) via one or more networks, such as the Internet. In some embodiments, the electronic device 108 may be substituted with a plurality of networked servers, such as servers in a cloud computing network.

The one or more processors 302 and the memory 304 of the electronic device 108 may implement components that include the image consolidation engine 106, a color adjustment module 306, a tracking module 308, a user interface module 310, and a data store 312. The image consolidation engine 106 may propagate the multispectral data in each grayscale image 116 to a corresponding RGB image 112 accordingly to color similarity and spatial proximity. In various embodiments, the image consolidation engine 106 may implement a bilateral filtering technique that is capable of performing the propagation in real-time. Accordingly, the image consolidation engine 106 may produce consolidated images 118 in the form of a streaming video. In various embodiments, the image consolidation engine 106 may include a multispectral propagation module 314 and a temporal enhancement module 316. The modules may include routines, programs instructions, objects, and/or data structures that perform particular tasks or implement particular abstract data types.

The bilateral filtering technique may account for a difference in the light intensity of a grayscale image 116 and the light intensity of its corresponding RGB image 112. As a result of the usage of the occlusion mask 220, a RGB image 112 may include one or more RGB pixels that do not correspond to a multispectral sample from a corresponding grayscale image 116, as well as one or more RGB pixels with correspondence to multispectral data from a corresponding grayscale image 116. For example, the overlapping of a RGB image with a resolution of p×q pixels and a corresponding multispectral grayscale image of a resolution m×n (m<p, n<q) may produce an example combined frame 318. In the frame 318, there may be RGB pixels (shown as shaded pixels) that have corresponding multispectral samples (herein referred to as "associated pixels"), and RGB pixels (shown as unshaded pixels) that have no corresponding multispectral samples (herein referred to as "unassociated pixels"). As shown, pixel 320 is an example associated pixel that has a corresponding multispectral sample, while pixel 322 is an example unassociated pixel that lacks a corresponding multispectral sample.

However, the multispectral propagation module 314 may derive the multispectral data for each unassociated pixel based on color similarity and spatial distance between each unassociated pixel and the surrounding associated pixels.

With respect to the example frame 318, the multispectral propagation module 314 may calculate the multispectral information for each unassociated pixel (i,j) from its neighboring associated pixels as follows in equation (2):

$$ms_{ij} = \sum_{c \in R,G,B} \frac{\sum_{k \in \Omega} \mathcal{G}_{\sigma_r}(d_k^{RGB})\mathcal{G}_{\sigma_s}(d_k^{xy}) \cdot \rho_k \cdot ms_k^c}{\sum_{k \in \Omega} \mathcal{G}_{\sigma_r}(d_k^{RGB})\mathcal{G}_{\sigma_s}(d_k^{xy})} \quad (2)$$

in which $ms_{ij}$ denotes the multispectral vector for each unassociated pixel (i,j), $k \in \Omega$ indexes the associated pixels within a neighborhood centered on (i,j), $\mathcal{G}\sigma()$ represents the Gaussian operator with zero mean and variance $\sigma$, and $d_k^{RGB}$ and $d_k^{xy}$ denote the Euclidean distance between the unassociated pixels (i,j) and k in RGB space and (x,y) space, respectively. In computing $d_k^{RGB}$, the multispectral propagation module 314 may use the RGB values of k in the RGB image that formed the frame 318. The factor $\rho_k$ represents the ratio of a given color channel value at k to the corresponding value at (i,j) (e.g., $\rho_k = R_{i,j}/R_k$ for the red channel) and is included for intensity matching. In at least one embodiment, parameter settings of $\sigma_s = 16$ and $\sigma_r = 16$ may be used, while the radius of neighborhood $\Omega$ may be set to two times the Euclidean distance between horizontally neighboring multispectral samples. However, other parameter settings may be implemented in additional embodiments.

Thus, as illustrated in equation (2), the multispectral propagation module 314 may propagate multispectral data between pixels with similar RGB values, as such similarity is a strong indicator of similarity in scene radiance spectra. In some embodiments, the multispectral propagation module 314 may propagate the multispectral data from one or more neighboring associated pixels on a per-channel basis to each of the RGB channels of each unassociated pixel. In this way, the slight intensity differences in different parts of the spectrum between source associated pixels and target unassociated pixels may be accounted for and modulated using the factor $\rho$. As such, the use of the factor $\rho$ may enable the multispectral propagation module 314 to handle subtle variations in shading during propagation scenarios in which the multispectral samples are sparse.

For the per-channel propagation, the multispectral propagation module 314 may separate the multispectral data from the multispectral grayscale image (e.g., grayscale image 116) into RGB channels according to the relative responses of the RGB filters of the RGB camera 110 at each wavelength (e.g., each wavelength between 400 nm to 700 nm), as shown in equations (3) and (4):

$$ms_k^c = ms_k \otimes w^c \text{ for } c=r,g,b \quad (3)$$

in which $$w_\lambda^c = \frac{q_\lambda^c}{\sum_c q_\lambda^c} \quad (4)$$

and $q_\lambda^c$ denotes the response of filter c at wavelength $\lambda$. Thus, after propagating the per-channel multispectral data, the multispectral propagation module 314 may, for each unassociated pixel, sum the spectral values of the corresponding RGB channels to obtain a full spectrum for each unassociated pixel.

In instances in which the hybrid camera tool 102 is configured to capture video streams, the temporal enhancement module 316 may propagate multispectral data temporally between different frames. The temporal propagation of multispectral data may be based on the presumption that the multispectral data recorded for a scene point in one frame may be approximately valid for the same scene point in another frame.

In various embodiments, the temporal enhancement module 316 may use an optical flow algorithm to track scene points for which multispectral data has been obtained. For example, the optical flow algorithm may discern a pattern in the apparent motion of an object in a series of images, and use such a pattern to predict the location of a scene point in subsequent images. Based on such predictions, the temporal enhancement module 316 may then propagate the multispectral data at these scene points from one or more preceding images to one or more subsequent images. In at least one embodiment illustrated in a scenario 324, the temporal enhancement module 316 may, for an image 326 at time instant t, use temporal correspondence from the two preceding images 328 and 330 at t-1 and t-2, respectively, to generate more associated pixels for the image 326. For example, as shown in the scenario 324, the temporal enhancement module 316 may propagate the multispectral sample of an associated pixel 332 from the image 330 to the image 326 so an unassociated pixel 334 in the image 326 becomes an associated pixel. In other embodiments, other optical flow algorithms that discern patterns of motion from more or less preceding images may be implemented.

The color adjustment module 306 may automatically make color adjustments, such as white balance, for the images. In various embodiments, the high spatial and high spectral resolution nature of the consolidated images 118 may aid the color adjustment module 306 in performing white balance adjustments. The color adjustment module 306 may receive the consolidated images 118 directly from the image consolidation engine 106.

For example, a conventional RGB camera may capture a RGB image of a warm colored object illuminated by fluorescent lighting. However, the warm colors of the object in the RGB image may lead the color adjustment module 306 to infer that object was illuminated by tungsten light instead of fluorescent light. This incorrect inference may lead the color adjustment module 306 to incorrectly adjust the white balance of the image.

In contrast, when the color adjustment module 306 receives a consolidated image 118 of the same warm colored object, the color adjustment module 306 may use the additional spectral peak information in the consolidated image 118 (e.g., spectral peaks at 546 nm and 611 nm) to correctly deduce that the object was illuminated by fluorescent lighting. The color adjustment module 306 may then correctly adjust the white balance in the consolidated image 118 based on this deduction.

The tracking module 308 may track one or more objects that are recorded in the consolidated images 118. The tracking module 308 may receive the consolidated images 118 directly from the image consolidation engine 106. The tracking of a foreground object may be based on distinguishing the foreground object from a background. Such distinction may be particularly challenging when the foreground object has a similar color as the background. However, by using the high spatial resolution and high spectral resolution consolidated images 118, the tracking module 308 may easily distinguish the captured foreground object from the background in such a scenario, as the spectral differences (e.g., different spectral peaks) between the similarly colored foreground object and the background may be more evident than in comparable low spectral resolution images. As a result, the tracking module 308 may effectively track such an object that is captured in the consolidated image 118 in the above scenario.

The user interface module 310 may enable a user to interact with the various modules on the electronic device 108 using a user interface (not shown). The user interface may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

In various embodiments, the user interface module 310 may enable a user to adjust various threshold values and settings used by the modules of the image consolidation engine 106, the color adjustment module 306, and/or the tracking module 308. For example, the user may use the user interface module 310 to adjust the factor $\rho$ used by the multispectral propagation module 314. In another example, the user may also use the user interface module 310 to input the number of preceding images analyzed by the optical flow algorithm of the temporal enhancement module 316. In additional examples, the user may use the user interface module 310 to adjust the white balancing settings of the color adjustment module 306 or select one or more objects to be tracked by the tracking module 308.

The data store 312 may store the RGB images 112, the grayscale images 116, and the consolidated images 118. In various embodiments, each collection of images may be frames in a corresponding video. The RGB images 112, the grayscale images 116, and the consolidated images 118 may be stored in uncompressed (i.e., raw), lossless compression, or lossy compression formats. Additionally, the data store 312 may also store values or other intermediate products that are generated or used by various components of the hybrid camera tool 102.

Example Processes

Figure 4:
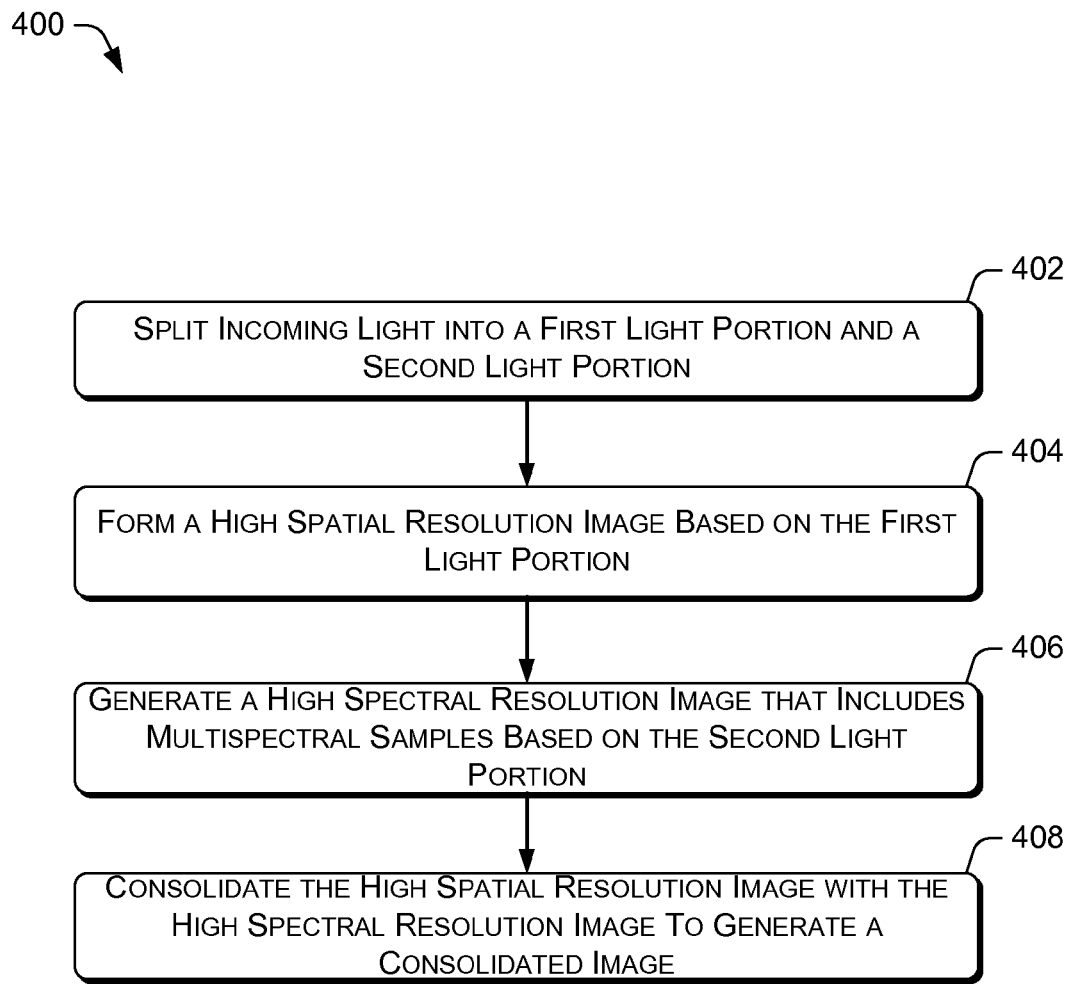
FIG. 4 is a flow diagram that illustrates an example process for generating a high spatial resolution and high spectral resolution consolidated image.
Figure 5:
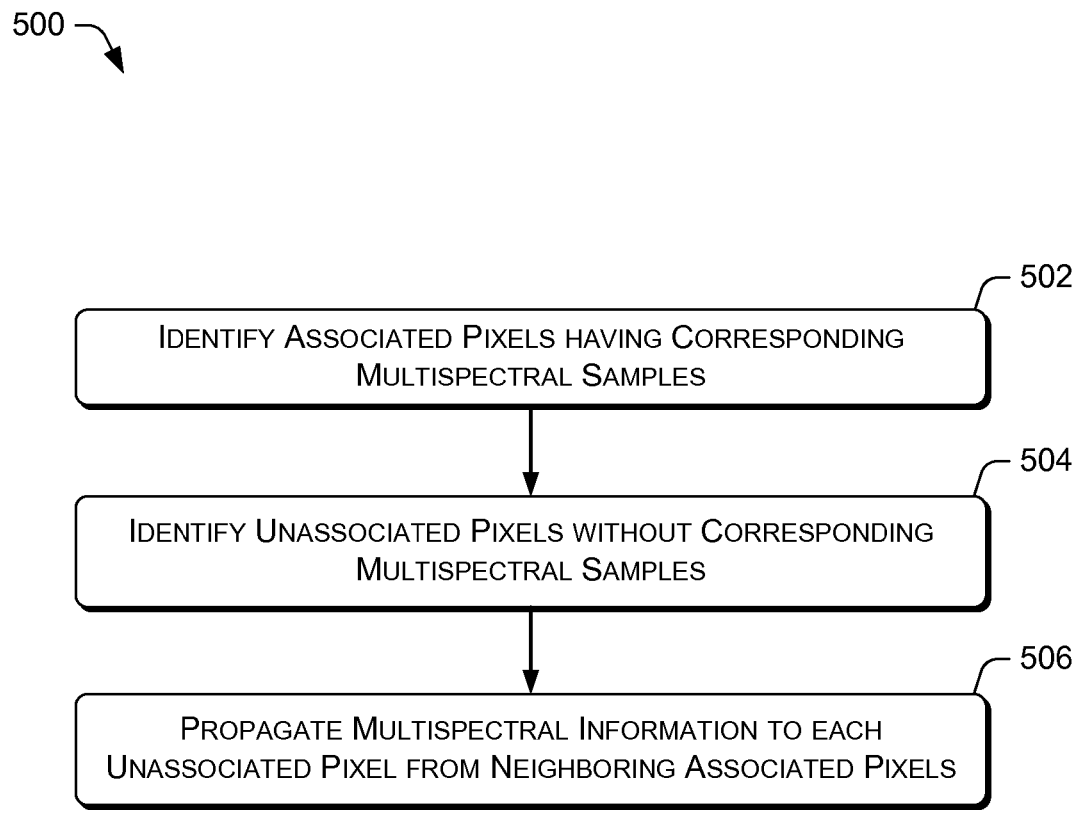
FIG. 5 is a flow diagram that illustrates an example process for propagating multispectral information to pixels from a high spectral resolution image to a high spatial resolution image.

FIGS. 4 and 5 describe various example processes for implementing a hybrid camera tool. The order in which the operations are described in each example process is not intended to be construed as a limitation, and any number of the described operations can be combined in any order and/or in parallel to implement each process. Moreover, the operations in each of the FIGS. 4 and 5 may be implemented in hardware, software, and a combination thereof. In the context of software, the operations represent computer-executable instructions that, when executed by one or more processors, cause one or more processors to perform the recited operations. Generally, computer-executable instructions include routines, programs, objects, components, data structures, and so forth that cause the particular functions to be performed or particular abstract data types to be implemented.

FIG. 4 is a flow diagram that illustrates an example process 400 for generating a high spatial resolution and high spectral resolution consolidated image. At block 402, the beam splitter 208 may split incoming light from a scene or object 204 into a first light portion and a second light portion. At block 404, the RGB camera 110 may form a high spatial resolution RGB image 112 based on the first light portion. The RGB image 112 may have lower spectral resolution than the high spectral resolution grayscale image 116. The RGB image 112 may encode the image based on red, green, and blue color channel data. In some embodiments, the first light portion may be reflected by a mirror 214 prior to reaching the RGB camera 110.

At block 406, a combination of the occlusion mask 220, the prism 218, and the grayscale camera 114 may generate a high spectral resolution grayscale image 116 that includes multispectral samples. The grayscale image 116 may have a lower spatial resolution than the high spatial resolution RGB image 112. In one example, each spectral sample (e.g., spectral sample 228) may span approximately 60 pixels over the wavelength of 400 nm to 700 nm, which is equivalent to a spectral resolution of about 5 nm. In some embodiments, a filter 224 may be further positioned in a light path between the occlusion mask 220 and the prism 218 to filter out a certain band of the spectrum in the second light portion prior to the generation of the high spectral resolution image.

At block 408, the image consolidation engine 106 may consolidate the high spatial resolution RGB image 112 and the high spectral resolution grayscale image 116 to generate a consolidated image 118. In some embodiments, the consolidated image 118 may have both the high spatial resolution of the RGB image 112 and the high spectral resolution of the grayscale image 116. The consolidation between the RGB image 112 and the grayscale image 116 may be achieved due to the fact that the corresponding RGB camera 110 and grayscale camera 114 are aligned. In some instances, the cameras may be aligned by associating sensor elements in the cameras via calibration. In some embodiments, the consolidated image 118 may be further processed (i.e., white balanced) by the color adjustment module 306. In other embodiments, the image consolidation engine 106 may generate a sequence of consolidated images that form a video stream by repeating process 400 for a sequence of high spatial resolution RGB images and a corresponding sequence of high spectral resolution grayscale images.

FIG. 5 is a flow diagram that illustrates an example process 500 for propagating multispectral information to pixels from a high spectral resolution image to a high spatial resolution image. The example process 500 may further illustrate block 408 of the process 400.

At block 502, the multispectral propagation module 314 may identify RGB pixels in a RGB image 112 that have corresponding multispectral samples. As described above, such pixels are referred to herein as "associated pixels". In some embodiments, the multispectral propagation module 314 may acquire the corresponding multispectral samples from a grayscale image 116 that corresponds to the RGB image 112. In other embodiments, the temporal enhancement module 316 may also supply additional multispectral samples that are acquired from one or more RGB images that temporally preceded the RGB image 112 so that additional associated pixels may be identified.

At block 504, the multispectral propagation module 314 may identify RGB pixels in a RGB image 112 that are without corresponding multispectral samples from a matching grayscale image 116 and/or acquired from preceding RGB images. As described above, such pixels are referred to herein as "unassociated pixels."

At block 506, the multispectral propagation module 314 may propagate multispectral information to each unassociated pixel from one or more neighboring associated pixels. The multispectral propagation module 314 may propagate multispectral data between pixels with similar RGB values, as such similarity is a strong indicator of similarity in scene radiance spectra. In some embodiments, the multispectral propagation module 314 may propagate the multispectral data from one or more neighboring associated pixels on a per-channel basis to the individual RGB channels of each unassociated pixel, and then sum the spectral values of the RGB channels to obtain the full spectrum for each unassociated pixel. In this way, the multispectral propagation module 314 may propagate multispectral information to each unassociated pixel.

The hybrid camera tool may offer superior images than a standalone RGB camera by providing images with higher spectral resolution. Likewise, the hybrid camera tool may also offer superior images than a standalone grayscale camera by providing images with higher spatial resolution. Thus, unlike systems that tradeoff either temporal or spatial resolution for additional spectral information, the hybrid camera tool does not sacrifice resolution in exchange for spectral accuracy.

CONCLUSION

In closing, although the various embodiments have been described in language specific to structural features and/or methodological acts, it is to be understood that the subject matter defined in the appended representations is not necessarily limited to the specific features or acts described. Rather, the specific features and acts are disclosed as exemplary forms of implementing the claimed subject matter.

The invention claimed is:

1. A device, comprising:
a beam splitter to split incoming light into a first light portion and a second light portion;
a first camera that records a red, green, blue (RGB) image based on the first light portion;
an occlusion mask including multiple openings that subsample light radiance representing a first spectrum of light that is substantially similar to a second spectrum of the second light portion incident to the occlusion mask, the multiple openings permitting at least some, but not all, of the light radiance of the second light portion to pass directly through to provide multispectral samples;
a second camera that records a grayscale image that includes the multispectral samples; and
an image consolidation engine configured to:
determine a spatial resolution based at least in part on the RGB image;
determine a spectral resolution based at least in part on the grayscale image; and
determine a consolidated image having the determined spatial resolution and the determined spectral resolution based at least in part on the RGB image and the grayscale image.

2. The device of claim 1, further comprising an opaque enclosure that includes an aperture to pass the incoming light to the beam splitter, the opaque enclosure at least enclosing the beam splitter, the occlusion mask, and a prism.

3. The device of claim 1, further comprising a mirror that reflects the first light portion from the beam splitter to the first camera at an angle that reduces a distance between the first camera and the second camera.

4. The device of claim 1, further comprising a prism or another spectrally dispersive optical component that disperses the second light portion across the second camera along an initial direction, wherein the second camera comprises a plurality of sensor elements and the device is further configured to average the multispectral samples provided by ones of the sensor elements along a second direction that is substantially perpendicular to the initial direction.

5. The device of claim 1, further comprising a filter that filters the second light portion to remove one or more spectrum bands of the second light portion.

6. The device of claim 1, wherein the occlusion mask includes multiple openings that permit at least some of the light radiance of the second light portion to pass directly through the occlusion mask.

7. A device, comprising:
a beam splitter to split incoming light from a scene into a first light portion and a second light portion;
a first camera that records a red, green, blue (RGB) image based on the first light portion;
an occlusion mask that subsamples light radiance representing a first spectrum of the second light portion that is substantially similar to a second spectrum of the second light portion incident to the occlusion mask, the occlusion mask preventing transmission of overlapping spectra from different scene points in the scene and providing multispectral samples from the second light portion;
a second camera that records a grayscale image that includes the multispectral samples; and
an image consolidation engine configured to:
determine a spatial resolution based at least in part on the RGB image;
determine a spectral resolution based at least in part on the grayscale image; and
determine a consolidated image having the determined spatial resolution and the determined spectral resolution.

8. The device of claim 7, further comprising an opaque enclosure that includes an aperture to pass the incoming light to the beam splitter, the opaque enclosure at least enclosing the beam splitter, the occlusion mask, and a prism.

9. The device of claim 7, further comprising a mirror that reflects the first light portion from the beam splitter to the first camera at an angle that reduces a distance between the first camera and the second camera.

10. The device of claim 7, further comprising a prism or another spectrally dispersive optical component that disperses the second light portion across the second camera along an initial direction, wherein the second camera comprises a plurality of sensor elements and the device is further configured to average the multispectral samples provided by ones of the sensor elements along a second direction that is substantially perpendicular to the initial direction.

11. The device of claim 7, further comprising a filter that filters the second light portion to remove one or more spectrum bands of the second light portion.

12. The device of claim 7, wherein the occlusion mask includes multiple openings that permit at least some of the light radiance of the second light portion to pass directly through the occlusion mask.

13. A device, comprising:
a beam splitter to split incoming light into a first light portion and a second light portion;
a first camera that records a red, green, blue (RGB) image based on the first light portion;
a second camera that records a grayscale image, the second camera comprising sensor elements arranged in horizontal rows and in vertical rows;
an occlusion mask including multiple openings that allow a subsample of a full spectrum of light radiance from the second light portion to provide multispectral samples, wherein the subsample represents a substantially similar spectrum of light radiance as the second light portion incident to the occlusion mask; and
a spectrally dispersive optical component that disperses the multispectral samples to provide dispersed samples, wherein:

the second camera records the grayscale image that is formed by the dispersed samples; and:

the spectrally dispersive optical component is configured to disperse at least one of:

the multispectral samples along the horizontal rows, the device further configured to average samples provided by multiple sensor elements along at least one vertical row; or the multispectral samples along the vertical rows, the device further configured to average samples provided by multiple sensor elements along at least one horizontal row.

14. The device of claim 13, further comprising an image consolidation engine configured to:

determine a spatial resolution based at least in part on the RGB image;

determine a spectral resolution based at least in part on the grayscale image; and determine a consolidated image having the determined spatial resolution and the determined spectral resolution.

15. The device of claim 13, further comprising an opaque enclosure that includes an aperture to pass the incoming light to the beam splitter, the opaque enclosure at least enclosing the beam splitter, the occlusion mask, and the prism.

16. The device of claim 13, further comprising a mirror that reflects the first light portion from the beam splitter to the first camera at an angle that reduces a distance between the first camera and the second camera.

17. The device of claim 13, further comprising a filter that filters the second light portion to remove one or more spectrum bands of the second light portion.

18. The device of claim 13, wherein the multiple openings permit at least some of the light radiance of the second light portion to pass directly through to provide the multispectral samples.

* * * * *